(12) United States Patent
Syed et al.

(10) Patent No.: US 12,323,920 B2
(45) Date of Patent: Jun. 3, 2025

(54) CELL SEARCH BASED ON USER EQUIPMENT (UE) BATTERY CONDITION

(71) Applicant: Apple Inc., Cupertino, CA (US)

(72) Inventors: Ehsan Ahmed Quadri Syed, Teaneck, NJ (US); Fnu Srinivas Kote Narasimhamurthy, San Diego, CA (US); Mohamed Lamine Haidara, New Providence, NJ (US); Mohammad H. Akhtar, Morris Plains, NJ (US); Syed A. Rahim, Allen, TX (US); Muthukumaran Dhanapal, San Diego, CA (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 17/806,391

(22) Filed: Jun. 10, 2022

(65) Prior Publication Data
US 2023/0403650 A1  Dec. 14, 2023

(51) Int. Cl.
*H04W 4/00* (2018.01)
*H04W 48/16* (2009.01)
*H04W 52/02* (2009.01)

(52) U.S. Cl.
CPC ....... *H04W 52/0261* (2013.01); *H04W 48/16* (2013.01); *H04W 52/0241* (2013.01); *H04W 52/0254* (2013.01)

(58) Field of Classification Search
CPC ............. H04W 52/0261; H04W 48/16; H04W 52/0241; H04W 52/0254; Y02D 30/70
See application file for complete search history.

(56) References Cited

U.S. PATENT DOCUMENTS

| | | | | |
|---|---|---|---|---|
| 5,095,308 A * | 3/1992 | Hewitt | ............. | H04W 52/0245 340/636.11 |
| 7,844,265 B2 * | 11/2010 | Kuchibhotla | ..... | H04W 52/0245 455/574 |
| 8,010,167 B2 * | 8/2011 | Cotevino | .......... | H04W 52/0261 455/574 |
| 8,554,163 B2 * | 10/2013 | Deshpande | ....... | H04W 52/0277 455/135 |
| 8,805,360 B2 | 8/2014 | Nagaraj | | |
| 8,989,035 B2 * | 3/2015 | Damji | ............... | H04W 52/0254 370/252 |
| 8,989,743 B2 * | 3/2015 | Sane | ................. | H04W 52/0254 455/574 |

(Continued)

*Primary Examiner* — Stephen M D'Agosta
(74) *Attorney, Agent, or Firm* — STERNE, KESSLER, GOLDSTEIN & FOX P.L.L.C.

(57) ABSTRACT

Some aspects of this disclosure relate to apparatuses and methods for implementing cell search based on battery conditions of a user equipment (UE). For example, some aspects of this disclosure relate to a UE. The UE includes a transceiver configured to enable wireless communication with a base station and a processor communicatively coupled to the transceiver. The processor is configured to perform a cell search cycle in response to a determination that a connection with the base station has been lost. In response to a determination that UE is in a no-service mode or in a limited-service mode after the cell search cycle, the processor further configures a sleep timer value based at least on one of a charge level of a battery of the UE or a capacity level of the battery. The processor further performs a second cell search cycle after the configured sleep timer value.

15 Claims, 8 Drawing Sheets

(56) References Cited

U.S. PATENT DOCUMENTS

| | | | | |
|---|---|---|---|---|
| 9,225,759 B2* | 12/2015 | Vannithamby | | H04B 7/0456 |
| 9,319,985 B2* | 4/2016 | Vangala | | H04W 36/0088 |
| 9,451,550 B2* | 9/2016 | Chin | | H04W 24/10 |
| 9,491,672 B2* | 11/2016 | Prakash | | H04W 76/27 |
| 9,510,244 B2* | 11/2016 | Park | | H04W 48/16 |
| 9,763,192 B1* | 9/2017 | Vivanco | | H04W 52/0251 |
| 9,838,837 B2* | 12/2017 | Chesnutt | | G01S 5/0221 |
| 9,930,299 B2* | 3/2018 | Modestine | | H04N 5/77 |
| 10,757,640 B2* | 8/2020 | Mori | | H04W 52/0241 |
| 2003/0095516 A1* | 5/2003 | Ok | | H04B 1/70735 |
| | | | | 370/332 |
| 2003/0104849 A1* | 6/2003 | Arimitsu | | H04W 52/029 |
| | | | | 455/574 |
| 2009/0103503 A1* | 4/2009 | Chhabra | | H04W 4/029 |
| | | | | 370/338 |
| 2009/0131081 A1* | 5/2009 | Abdel-Kader | | H04W 48/16 |
| | | | | 455/434 |
| 2009/0137267 A1* | 5/2009 | Nader | | H04B 17/382 |
| | | | | 455/552.1 |
| 2009/0253469 A1* | 10/2009 | Herczog | | H04W 52/0261 |
| | | | | 455/573 |
| 2011/0215966 A1* | 9/2011 | Kim | | H04W 52/0261 |
| | | | | 342/357.29 |
| 2012/0131367 A1* | 5/2012 | Kamijima | | G06F 1/3212 |
| | | | | 713/323 |
| 2013/0029662 A1* | 1/2013 | Axmon | | H04W 48/16 |
| | | | | 455/434 |
| 2015/0173013 A1* | 6/2015 | Iwai | | H04W 52/0232 |
| | | | | 455/418 |
| 2015/0230160 A1* | 8/2015 | Lin | | H04W 76/18 |
| | | | | 370/252 |
| 2016/0029431 A1* | 1/2016 | Shimizu | | H04W 76/38 |
| | | | | 370/252 |
| 2017/0251519 A1* | 8/2017 | Ohlsson | | H04W 72/21 |
| 2018/0199290 A1* | 7/2018 | Bang | | H04W 24/08 |
| 2018/0233956 A1* | 8/2018 | Moussaoui | | H02J 50/12 |
| 2019/0239097 A1* | 8/2019 | Meylan | | H04W 24/02 |
| 2019/0349858 A1* | 11/2019 | Jantzi | | H04W 76/28 |
| 2020/0133371 A1* | 4/2020 | Chou | | G06F 1/3296 |
| 2021/0105853 A1* | 4/2021 | Kang | | H04W 76/27 |
| 2023/0199909 A1* | 6/2023 | Mohammad Soleymani | | H04W 52/0235 |
| | | | | 370/329 |

\* cited by examiner

CELL SEARCH BASED ON USER EQUIPMENT (UE) BATTERY CONDITION

BACKGROUND

Field

The described aspects generally relate to mechanisms for cell search including considering a user equipment's battery conditions such as charge level and/or capacity level for cell search.

Related Art

In some examples, a cell search includes a process where a user equipment (UE) obtains frequency and time synchronization with a cell (e.g., a base station) and can decode the identifier of the cell (e.g., a cell ID) for connecting to the cell. The UE can perform the cell search when a UE is connecting to a cell for the first time, reconnecting to the cell (or another cell) after losing service, and/or reconnecting to the cell (or another cell) after having a limited service. In other words, the cell search can include out-of-service (e.g., no service) cell search and/or limited service to full service cell search.

SUMMARY

Some aspects of this disclosure relate to apparatuses and methods for implementing cell search based on UE's battery conditions. For example, some aspects of this disclosure relate to apparatuses and methods for implementing mechanisms to modify a cell search sleep timer based on the UE's battery charge level. Additionally, or alternatively, some aspects of this disclosure relate to apparatuses and methods for implementing mechanisms to modify the cell search sleep timer based on the UE's battery capacity level.

Some aspects of this disclosure relate to a user equipment (UE). The UE includes a transceiver configured to enable wireless communication with a base station and a processor communicatively coupled to the transceiver. The processor can be configured to perform a cell search cycle in response to a determination that a connection with the base station has been lost. In response to a determination that UE is in a no-service mode or in a limited-service mode after the cell search cycle, the processor can further configure a sleep timer value based at least on a capacity level of a battery of the UE. The processor further can perform a second cell search cycle after the configured sleep timer value.

In some aspects, the processor is further configured to configure the sleep timer value based on a charge level of the battery of the UE, and to configure the sleep timer value, the processor is configured to determine whether the charge level of the battery satisfies a first condition. In response to determining that the charge level of the battery satisfies the first condition and the UE is in motion, the processor is further configured to increase the sleep timer value from a first value to a second value greater than the first value. In response to determining that the charge level of the battery satisfies the first condition and the UE is stationary, the processor is further configured to increase the sleep timer value from the first value to a third value greater than the first value In some aspects, in response to determining that the charge level of the battery does not satisfy the first condition, the processor is configured to determine whether the charge level of the battery satisfies a second condition. In response to determining that the charge level of the battery satisfies the second condition and the UE is stationary, the processor is further configured to compare a search counter value indicating a number of cell search cycles with a search counter threshold. In response to the search counter value being greater than the search counter threshold, the processor is further configured to increase the sleep timer value from the first value to a fourth value greater than the first value.

In some aspects, the first condition includes the charge level of the battery being less than a first charge level threshold, and the second condition includes the charge level of the battery being more than a second charge level threshold and less than a third charge level threshold.

In some aspects, at least one of the first charge level threshold, the second charge level threshold, and the third charge level threshold is determined based at least on the capacity level of the battery.

In some aspects, to configure the sleep timer value, the processor is configured to determine whether the capacity level of the battery satisfies a first condition. In response to determining that the capacity level of the battery satisfies the first condition and the battery of the UE is in a charging state, the processor is further configured to increase the sleep timer value from a first value to a second value greater than the first value. In response to determining that the capacity level of the battery satisfies the first condition and the battery of the UE is in a non-charging state, the processor is further configured to increase the sleep timer value from the first value to a third value greater than the first value.

In some aspects, in response to determining that the capacity level of the battery does not satisfy the first condition, the processor is configured to determine whether the capacity level of the battery satisfies a second condition. In response to determining that the capacity level of the battery satisfies the second condition and the battery of the UE is in the non-charging state, the processor is further configured to compare a search counter value indicating a number of cell search cycles with a search counter threshold. In response to the search counter value being greater than the search counter threshold, the processor is further configured to increase the sleep timer value from the first value to a fourth value greater than the first value.

In some aspects, the first condition can include the capacity level of the battery being less than a first charge level threshold, and the second condition can include the capacity level of the battery being more than a second charge level threshold and less than a third charge level threshold, and the battery of the UE is in a non-charging state.

In some aspects, the processor is further configured to determine whether the UE is in a Low Power Mode (LPM). In response to determining that the UE is in LPM and the UE is in motion, the processor is further configured to increase the sleep timer value from a first value to a second value greater than the first value. In response to determining that the UE is in LPM and the UE is stationary, the processor is further configured to increase the sleep timer value from the first value to a third value greater than the first value.

Some aspects of this disclosure relate to a method including performing a cell search cycle in response to a determination that a connection of a user equipment (UE) with a base station has been lost. The method further includes configuring a sleep timer value based at least on a capacity level of a battery of the UE in response to a determination that UE is in a no-service mode or in a limited-service mode after the cell search cycle. The method further includes performing a second cell search cycle after the configured sleep timer value.

Some aspects of this disclosure relate to a non-transitory computer-readable medium storing instructions. When the instructions are executed by a processor of a user equipment (UE), the instructions cause the UE to perform operations including performing a cell search cycle in response to a determination that a connection of the UE with a base station has been lost. The operations further include in response to a determination that UE is in a no-service mode or in a limited-service mode after the cell search cycle, configuring a sleep timer value based at least on one of a capacity level of a battery of the UE or the UE being in a Low Power Mode (LPM). The operations further include performing a second cell search cycle after the configured sleep timer value.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to apparatuses and methods for implementing cell search based on UE's battery conditions. For example, some aspects of this disclosure relate to apparatuses and methods for implementing mecha- nisms to modify a cell search sleep timer based on the UE's battery charge level. Additionally, or alternatively, some aspects of this disclosure relate to apparatuses and methods for implementing mechanisms to modify the cell search sleep timer based on the UE's battery capacity level.

According to some aspects, after a UE performs a cell search, a cell search sleep timer is triggered in the UE. During this sleep timer duration, the UE does not perform any cell search. Some aspects of this disclosure relate to apparatuses and methods for implementing cell search based on UE's battery conditions such that the sleep timer can be configured dependent on the UE's battery conditions to help with battery savings during the cell search operations and/or other operations of the UE.

In some examples, the aspects of this disclosure can be performed by a network and/or a UE that operates according to $5^{th}$ generation (5G) wireless technology for digital cellular networks as defined by 3rd Generation Partnership Project (3GPP). Additionally, or alternatively, the aspects of this disclosure can be performed by a network and/or a UE that operates according to the Release 15 (Rel-15), Release 16 (Rel-16), Release 17 (Rel-17), Rel-17 new radio (NR), or others. However, the aspects of this disclosure are not limited to these examples, and one or more mechanisms of this disclosure can be implemented by other network(s) and/or UE(s) for using cell search based on UE's battery conditions.

According to some aspects, with 5G NR Non-Standalone and Standalone deployments around the world, the 5G UEs can be capable of much higher data rates. In a non-limiting example, the UEs can be capable of up to, but not limited to, a theoretical maximum of 20 times faster compared to legacy cellular technologies. In a non-limiting example, maximum carrier aggregated bandwidth can be about 800 MHz for 5G compared to about 100 MHz on Long-Term Evolution (LTE), and theoretical peak data rates can reach up to, but is not limited to, 20 Gbps downlink in 5G compared to 1 Gbps in LTE. These higher data rates in 5G can increase the power consumption on UE, making battery life all the more critical, and therefore, enhancements are needed in various domains in order to conserve the battery life as much as possible. Some aspects of this disclosure relate to apparatuses and methods for implementing cell search based on UE's battery conditions to help with battery savings.

Figure 1:
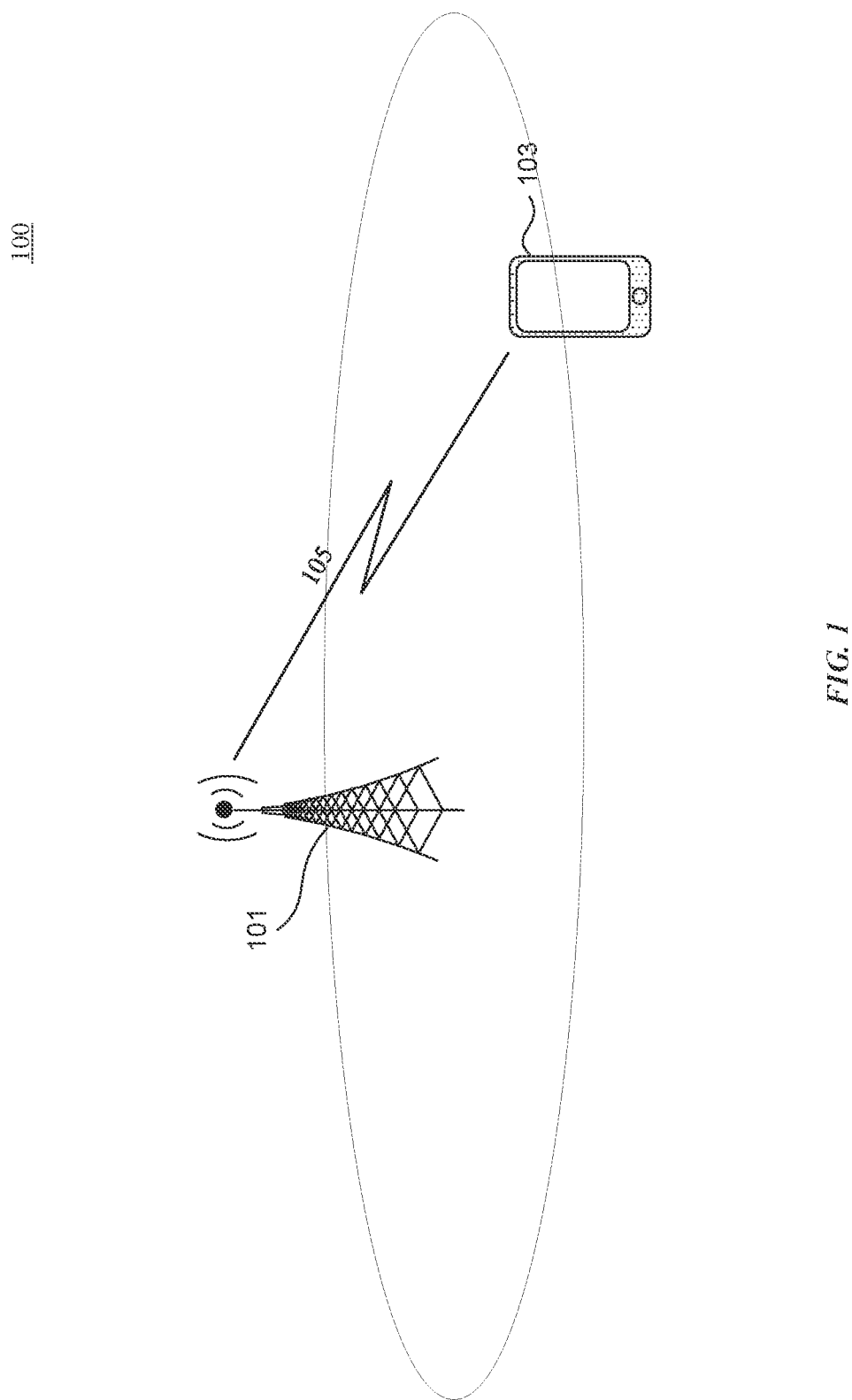
FIG. 1 illustrates an example system implementing cell search based on UE's battery conditions, according to some aspects of the disclosure.

FIG. 1 illustrates an example system 100 implementing cell search based on UE's battery conditions, according to some aspects of the disclosure. Example system 100 is provided for the purpose of illustration only and does not limit the disclosed aspects.

System 100 may include, but is not limited to, network node (for example, base stations such as eNBs, gNBs, and the like) 101 and electronic device (for example, a UE) 103. Electronic device 103 (hereinafter referred to as UE 103) can be configured to operate based on a wide variety of wireless communication techniques. These techniques can include, but are not limited to, techniques based on 3rd Generation Partnership Project (3GPP) standards. For example, UE 103 can be configured to operate using Rel-17 or other. UE 103 can include, but is not limited to, wireless communication devices, smart phones, laptops, desktops, tablets, personal assistants, monitors, televisions, wearable devices, Internet of Things (IoTs), vehicle's communication devices, and the like. Network node 101 (herein referred to as a base station or a cell) can include one or more nodes configured to operate based on a wide variety of wireless communication techniques such as, but not limited to, techniques based on 3GPP standards. For example, base station 101 can include one or more nodes configured to operate using Rel-17 or others.

According to some aspects, UE 103 can perform a cell search to connect to base station 101 for the first time, to connect to base station 101 after losing connection with another base station (not shown), to reconnect with base station 101 after losing connection (e.g., service) with base station 101, and/or to reconnect with base station 101 for a full connection (e.g., a full service) after having a limited connection (e.g., a limited service) with base station 101.

According to some aspects, the cell search performed by UE 103 can include, but is not limited to, out-of-service cell search and/or limited service to full service cell search. In some examples, the cell search and/or an initial access can be done using carrier 105.

According to some aspects, a cell search can include a process where UE 103 can obtain frequency and time synchronization with a cell (e.g., base station 101) and can decode the identifier of the cell (e.g., a cell ID) for connecting to the base station 101. According to some aspects, the cell search can include one or more processing to connect to base station 101 and establish one or more services between UE 103 and base station 101. For example, the cell search can include a scanning process where UE 103 can use one or more frequencies and measure signal qualities (such as but not limited to Received Signal Strength Indicator (RSSI)). According to some aspects, after the scanning process, UE 103 can select a number of frequencies to perform additional processes of the cell search. In some examples, one additional process performed by UE 103 can include, but is not limited to, measuring additional parameters for the selected frequencies. The additional parameters can include Reference Signal Received Power (RSRP), Reference Signal Received Quality (RSRQ), and/or other parameters. The measurement process can be done for a serving cell and/or for a non-serving cell.

According to some aspects, the cell search can further include the evaluation of the measured parameters. For example, UE 103 can further evaluate the measured parameters based on one or more cell selection criteria. After evaluating the measured parameters, UE 103 can detect base station 101, obtain frequency and time synchronization with base station 101, and can decode the cell ID of base station 101 for connecting to the cell.

According to some aspects, by performing the cell search, UE 103 can connect to a new cell (e.g., base station 101) to start a full service (e.g., a full connection). Additionally, or alternatively, UE 103 can reconnect to base station 101 to resume full service after UE 103 had lost the service or had moved to a limited service. Additionally, or alternatively, UE 103 can connect to base station 101 to resume full service after UE 103 had lost the service with another base station or had moved to a limited service with another base station.

According to some aspects, UE 103 can perform a plurality of cell searches after UE 103 loses its service (e.g., connection) with a cell and/or loses its full service with the cell. UE 103 can perform these plurality of cell searches until UE 103 can gain its service (e.g., connection) with the cell or another cell. According to some aspects, between the cell searches (also referred to as cell search cycles), UE 103 does not perform the cell search. In these examples, a cell search sleep timer is triggered during which UE 103 does not perform the cell search.

As discussed in more detail below, some aspects of this disclosure relate to apparatuses and methods for modifying the cell search sleep timer based on the UE 103's battery charge level. Additionally, or alternatively, some aspects of this disclosure relate to apparatuses and methods for modifying the cell search sleep timer based on the UE 103's battery capacity level.

According to some aspects, UE 103 and/or base station 101 is configured to dynamically control the cell search sleep timer based on the battery charge level of UE 103. For example, if the battery charge level of UE 103 is less than a first charge level threshold, UE 103 and/or base station 101 can increase the value of the cell search sleep timer (also referred to herein as sleep timer value). According to some aspects, sleep timer value can have a first value (e.g., a default value). UE 103 can measure the battery charge level of UE 103 and compare the measured battery charge level of UE 103 with the first charge level threshold. If the battery charge level of UE 103 is less than the first charge level threshold and UE 103 is in motion, then UE 103 can increase the sleep timer value to a second value that is greater than the first value. Additionally, if the battery charge level of UE 103 is less than the first charge level threshold and UE 103 is stationary, then UE 103 can increase the sleep timer value to a third value that is greater than the first value.

According to some aspects, if the battery charge level of UE 103 is greater than the first charge level threshold, then UE 103 can compare the battery charge level of UE 103 with a second charge level threshold and a third charge level threshold. If the battery charge level of UE 103 is greater than the second charge level threshold and less than the third charge level threshold and UE 103 is stationary, then UE 103 can use a search counter to count the number of search cycles with the cell search sleep timer having the first value (e.g., the default value). In this example, each time the battery charge level of UE 103 is greater than the second charge level threshold and less than the third charge level threshold and UE 103 is stationary, then UE 103 can increase the search counter. UE 103 can compare the search counter with a search counter threshold. If the search counter is greater than the search counter threshold, then UE 103 can increase the sleep timer value to a fourth value that is greater than the first value.

According to some aspects, the first, second, and third charge level thresholds, the search counter threshold, and/or the second, third, and fourth values of the cell search sleep timer are configurable and implementation specific thresholds/values. These thresholds/values can be decided, for example, at the time of implementation based on Key Performance Indicators (KPIs) and/or performance of UE 103.

Additionally, or alternatively, to using battery charge level to adapt the sleep timer value, UE 103 and/or base station 101 can be configured to dynamically control the cell search sleep timer based on the battery capacity level of UE 103. For example, if the battery capacity level of UE 103 is less than a first capacity level threshold, UE 103 and/or base station 101 can increase the value of the cell search sleep timer. According to some aspects, the sleep timer value can have the first value (e.g., the default value). UE 103 can measure the battery capacity level of UE 103 and compare the measured battery capacity level of UE 103 with the first capacity level threshold. If the battery capacity level of UE 103 is less than the first capacity level threshold and UE 103 is in a charging state, then UE 103 can increase the sleep timer value to a fifth value that is greater than the first value. Additionally, if the battery capacity level of UE 103 is less than the first capacity level threshold and UE 103 is not in the charging state, then UE 103 can increase the sleep timer value to a sixth value that is greater than the first value.

According to some aspects, if the battery capacity level of UE 103 is greater than the first capacity level threshold, then UE 103 can compare the battery capacity level of UE 103 with a second capacity level threshold and a third capacity level threshold. If the battery capacity level of UE 103 is greater than the second capacity level threshold and less than the third capacity level threshold and UE 103 is not in the charging state, then UE 103 can use a search counter to count the number of search cycles with the cell search sleep timer having the first value. In this example, each time the battery capacity level of UE 103 is greater than the second capacity level threshold and less than the third capacity level threshold and UE 103 is stationary, then UE 103 can increase the search counter. UE 103 can compare the search counter with a search counter threshold. If the search counter is greater than the search counter threshold, then UE 103 can increase the sleep timer value to a seventh value that is greater than the first value.

According to some aspects, the first, second, and third capacity level thresholds, the search counter threshold, and/or the fifth, sixth, and seventh values of the cell search sleep timer are configurable and implementation specific thresholds/values. These thresholds/values can be decided, for example, at the time of implementation based on KPIs and/or performance of UE 103.

According to some aspects, the dynamic adaptation of the sleep timer value using battery charge level and/or battery capacity level can be applied to different modes of operation of UE 103. For example, UE 103 can be in a Low Power Mode (LPM). In the LPM, UE 103 and/or a user of UE 103 can opt to operate UE 103 is a low power mode where some operations of UE 103 can be disabled to preserve the battery of UE 103. For example, some background activities of UE 103 can be disabled while UE 103 is in LPM. In this example, the dynamic adaptation of the sleep timer value using battery charge level and/or battery capacity level can be applied to the LPM.

Additionally, or alternatively, when UE 103 is in LPM (e.g., the LPM is on), then UE 103 can use greater values of sleep timer value. According to some aspects, sleep timer value can have the first value (e.g., the default value). UE 103 can determine whether UE 103 is in the LPM. If UE 103 is in LPM and UE 103 is in motion, then UE 103 can increase the sleep timer value to an eighth value that is greater than the first value. Additionally, if UE 103 is in LPM and UE 103 is stationary, then UE 103 can increase the sleep timer value to a ninth value that is greater than the first value.

According to some aspects, the eighth and ninth values of the cell search sleep timer are configurable and implementation specific thresholds/values. These thresholds/values can be decided, for example, at the time of implementation based on KPIs and/or performance of UE 103.

According to some aspects, the first and second charge level thresholds can be the same. Additionally, or alternatively, the first, second, and third charge level thresholds can have different values.

According to some aspects, the first and second capacity level thresholds can be the same. Additionally, or alternatively, the first, second, and third capacity level thresholds can have different values.

According to some aspects, the first, second, and third capacity level thresholds can have the same or different values compared to the first, second, and third charge level thresholds According to some aspects, one or more of the first, second, and third values of the cell search sleep timer can be the same as one or more of the fourth, fifth, and sixth values of the cell search sleep timer, respectively. According to some aspects, one or more of the first and second values of the cell search sleep timer can be the same as one or more of the seventh and eighth values of the cell search sleep timer, respectively.

In some aspects, the dynamic adaptation of the sleep timer value using battery charge level, the dynamic adaptation of the sleep timer value using battery capacity level, and/or the dynamic adaptation of the sleep timer value at LPM can be combined. In other words, UE 103 can use two or more of the mechanisms discussed above (battery charge level, battery capacity level, and LPM) to dynamically adapt the sleep timer value. For example, UE 103 can use two or more of the mechanisms discussed above (battery charge level, battery capacity level, and LPM) at different points in time to dynamically adapt the sleep timer value. In some implementations, the UE 103 can dynamically adapt the sleep timer value using battery charge level after the UE 103 has dynamically adapted the sleep timer value using battery capacity level, or vice versa. In some implementations, the UE 103 can dynamically adapt the sleep timer value using LPM after the UE 103 has dynamically adapted the sleep timer value using battery capacity level, or vice versa. In some implementations, the UE 103 can dynamically adapt the sleep timer value using LPM after the UE 103 has dynamically adapted the sleep timer value using battery charge level, or vice versa. However, the aspects of this disclosure can include other combinations of the mechanisms discussed above (battery charge level, battery capacity level, and LPM) to dynamically adapt the sleep timer value.

In some aspects, the first, second, and third charge level thresholds used for dynamic adaptation of the sleep timer value using battery charge level can be adjusted based on the battery capacity level. For example, if the battery of UE 103 has a capacity level above a given threshold (the battery is a healthy battery), then the first, second, and/or third charge level thresholds used for dynamic adaptation of the sleep timer value can be adjusted to lower values. However, if the battery of UE 103 has a capacity level below a given threshold (the battery is not a healthy battery), then the first, second, and/or third charge level thresholds used for dynamic adaptation of the sleep timer value can be adjusted to higher values.

According to some aspects, the dynamic adjustment of the sleep timer value aspects of this disclosure can maximize the battery life of UE 103 while UE 103 is in a no-service mode or is in a limited-service mode. Additionally, or alternatively, the dynamic adjustment of the sleep timer value aspects of this disclosure can extend the battery life of UE 103 when the battery charge level is low. In a non-limiting example, there can be scenarios where UE 103 is in no-service area with low battery life and eventually moves back into service coverage area. Using the dynamic adjustment of the sleep timer value aspects of this disclosure, the battery life can be preserved to give UE 103 the best chance to regain cellular service.

Although some aspects of this disclosure are discussed with respect to some exemplary cell search operations, the aspects of this disclosure are not limited to these examples, and other cell search operations can be used.

Figure 2:
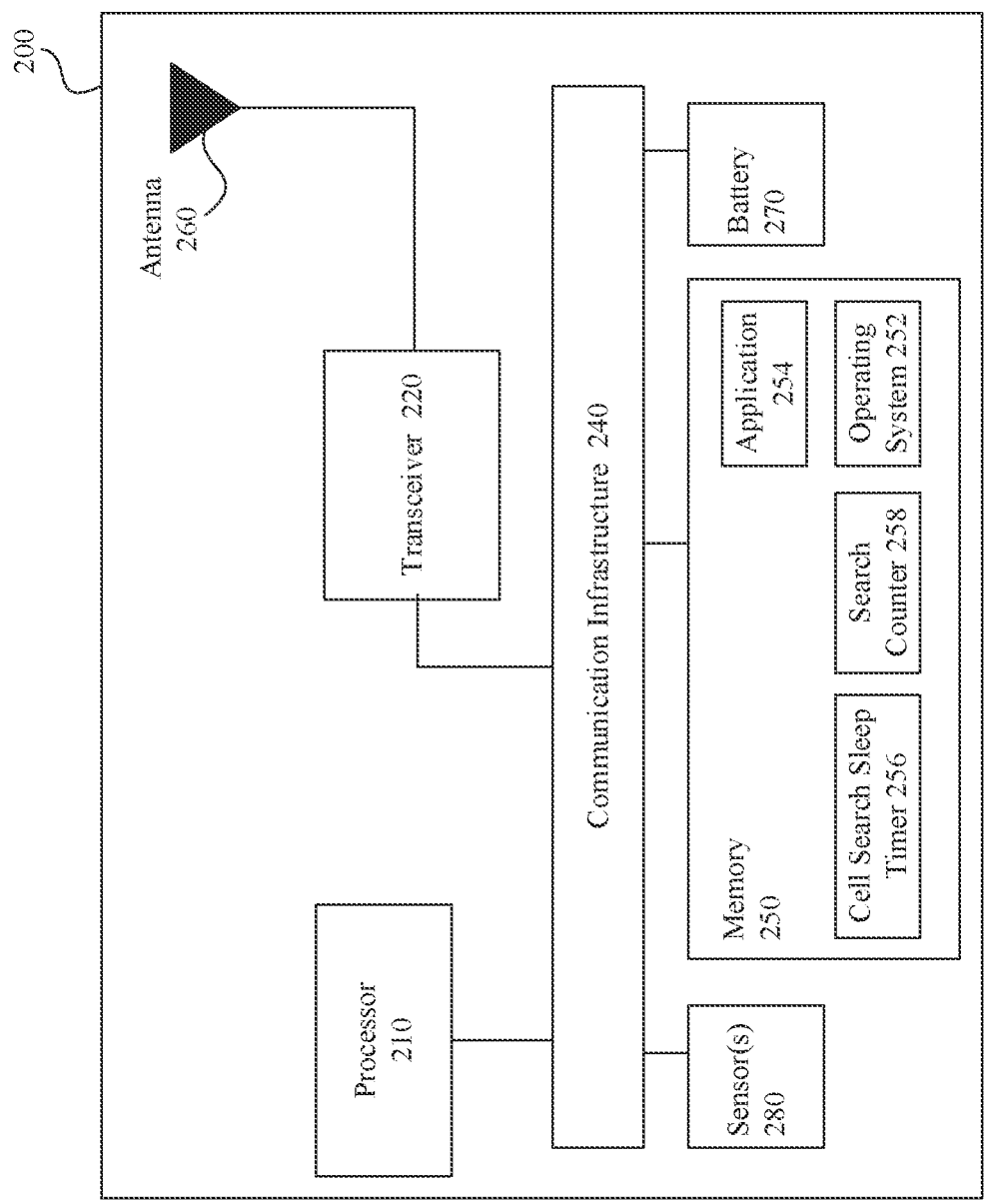
FIG. 2 illustrates a block diagram of an example system of an electronic device implementing cell search based on UE's battery conditions, according to some aspects of the disclosure.

FIG. 2 illustrates a block diagram of an example system 200 of an electronic device implementing cell search based on UE's battery conditions, according to some aspects of the disclosure. System 200 may be any of the electronic devices (e.g., base stations 101, UE 103) of system 100. System 200 includes processor 210, one or more transceivers 220, communication infrastructure 240, memory 250, operating system 252, application 254, antenna 260, battery 270, and sensor(s) 280. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components. Also, system 200 of the aspects of this disclosure can include any number of processors, transceivers, communication infrastructures, memories, operating systems, applications, antennas, batteries, and sensors.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data between memory 250, one or more applications 254, processor 210, one or more transceivers 220, battery 270, and/or sensor(s) 280. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, radio streaming, video streaming, remote control, and/or other user applications.

According to some aspects, memory 250 can store the charge level threshold(s), the capacity level threshold(s), the search counter threshold(s), and/or the values of the cell search sleep timer. In some aspects, memory 250 can include one or more cell search sleep timers such as cell search sleep timer 256. According to some examples, cell search sleep timer 256 can include a hardware timer and/or a software timer. In some examples, cell search sleep timer 256 can include a register to measure time or count events. However, the aspects of this disclosure are not limited to these examples. In some aspects, memory 250 can include one or more search counters such as search counter 258. According to some examples, search counter 258 can include a hardware counter and/or a software counter. In some examples, search counter 258 can include a register to count events. However, the aspects of this disclosure are not limited to these examples.

System 200 can also include communication infrastructure 240. Communication infrastructure 240 provides communication between, for example, processor 210, one or more transceivers 220, memory 250, battery 270, sensor(s) 280. In some implementations, communication infrastructure 240 may be a bus. Processor 210 together with instructions stored in memory 250 performs operations enabling system 200 of system 100 to implement cell search based on UE's battery conditions, as described herein.

One or more transceivers 220 transmit and receive communications signals that support the operations of system 200 including, but not limited to, cell search based on UE's battery conditions, according to some aspects, and may be coupled to antenna 260. Antenna 260 may include one or more antennas that may be the same or different types. One or more transceivers 220 allow system 200 to communicate with other devices that may be wired and/or wireless. In some examples, one or more transceivers 220 can include processors, controllers, radios, sockets, plugs, buffers, and like circuits/devices used for connecting to and communication on networks. According to some examples, one or more transceivers 220 include one or more circuits to connect to and communicate on wired and/or wireless networks.

According to some aspects, one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220 can include more or fewer systems for communicating with other devices.

In some examples, one or more transceivers 220 can include one or more circuits (including a WLAN transceiver) to enable connection(s) and communication over WLAN networks such as, but not limited to, networks based on standards described in IEEE 802.11. Additionally, or alternatively, one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or other of the 3GPP standards.

According to some aspects, processor 210, alone or in combination with computer instructions stored within memory 250, and/or one or more transceiver 220, implements cell search based on UE's battery conditions, as discussed herein.

According to some aspects, sensor(s) 280 can include one or more sensors within and/or coupled to system 200. For example, sensor(s) 280 can include one or more motion sensors configured to provide motion information related to system 200. In some examples, the motion sensors can determine whether system 200 is moving or is stationary. Additionally, or alternatively, the motion sensors can determine a distance (e.g., an approximate distance) that system 200 is moved within a time period, can determine the speed (e.g., an approximate speed) of system 200, and/or can determine an acceleration (e.g., an approximate acceleration) of system 200.

Additionally, or alternatively, sensor(s) 280 can include sensors configured to determine whether or not system 200 is in a charging state. For example, sensor(s) 280 can determine whether or not system 200 is connected to a charger device for charging system 200.

Additionally, or alternatively, sensor(s) 280 can include sensors configured to determine the charge level of battery 270. Additionally, or alternatively, sensor(s) 280 can include sensors configured to determine the capacity level or battery 270. In some examples, the capacity level of battery 270 can be a measure of the capacity of battery 270 relative to age (e.g., new or old) of battery 270 based on charging and discharging of battery 270. In some examples, a maximum capacity of battery 270 is a measure of the battery health. The capacity level of battery 270 can decrease with the age of battery 270 based on a number of charges and discharges of battery 270. In some examples, a lower capacity level of battery 270 may result in less time (e.g., fewer minutes/hours) that system 200 can be used between charges of battery 270.

Although some exemplary sensors are discussed, other sensors (such as, but not limited to, an accelerometer or shock sensor) can be used for sensors 280. Sensor data from sensors 280 (e.g., motion information, charge level, capacity level, charging state, etc.) can be used by processor 210 to adjust and control the values of the cell search sleep timer.

Figure 3:
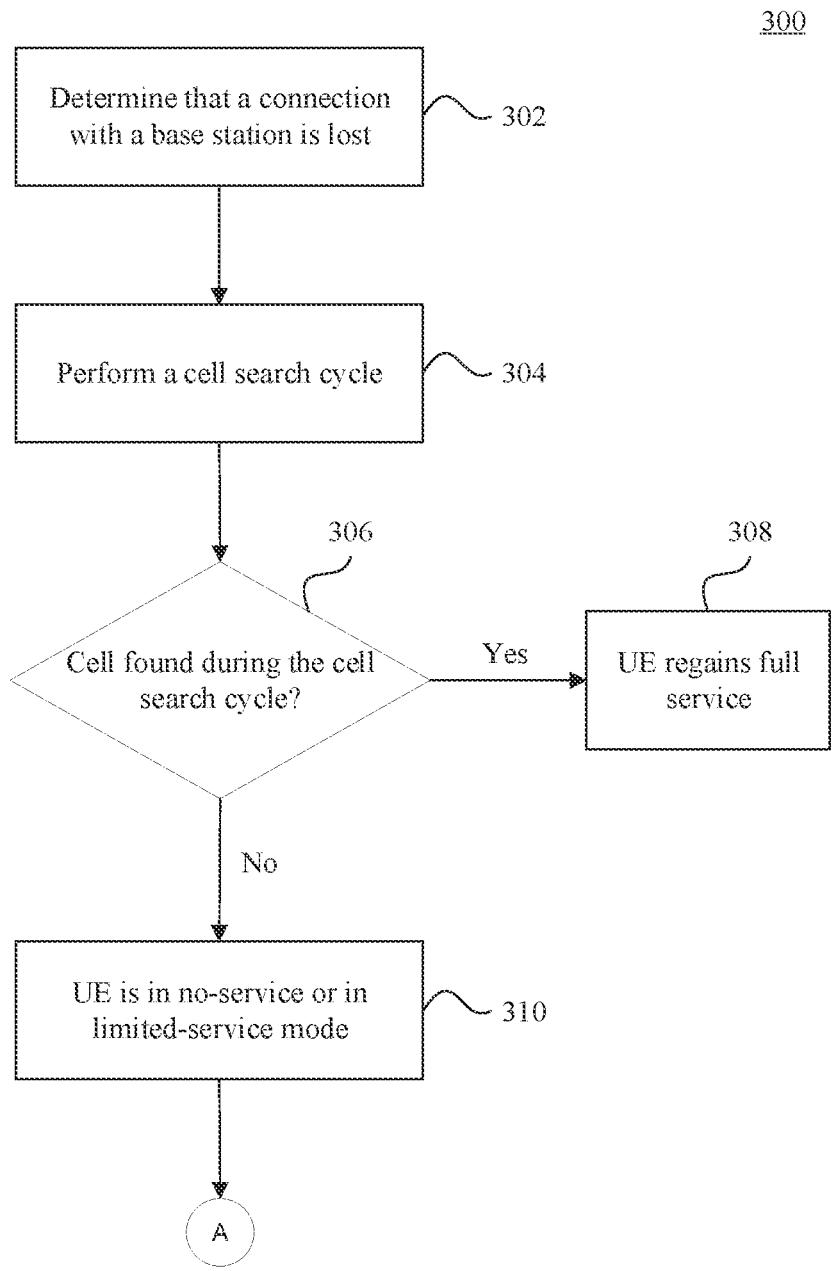
FIG. 3 illustrates an example method for a system (for example, a UE) performing cell search based on UE's battery conditions, according to some aspects of the disclosure.

FIG. 3 illustrates an example method for a system (for example, a UE) performing cell search based on UE's battery conditions, according to some aspects of the disclosure. As a convenience and not a limitation, FIG. 3 may be described with regard to elements of FIGS. 1-2. Method 300 may represent the operation of an electronic device (for example, UE 103 of FIG. 1) implementing cell search based on UE's battery conditions. Method 300 may also be performed by system 200 of FIG. 2 and/or computer system 600 of FIG. 6. But method 300 is not limited to the specific aspects depicted in those figures and other systems may be used to perform the method as will be understood by those skilled in the art. It is to be appreciated that not all operations may be needed, and the operations may not be performed in the same order as shown in FIG. 3.

At 302, a determination is made whether a connection with a base station is lost. For example, a UE (e.g., UE 103 of FIG. 1) can determine whether the UE has lost its connection with a cell (e.g., base station 101 of FIG. 1). In some examples, 302 can include determining whether the UE has lost its cellular service. For example, the UE can determine that it has lost its time and/or frequency synchronization with the cell. However, the aspects of this disclosure are not limited to this example and other methods and procedures can be used by the UE to determine whether the UE has lost its connection (e.g., its service) with a cell.

At 304, and in response to the determination that the connection with the base station is lost, the UE can perform a cell search. According to some aspects, the cell search cycle can be based on a default cell search sleep timer value.

At 306, it is determined whether a cell is found during the cell search cycle. For example, the UE determines whether it has found a cell during the cell search cycle using the exemplary processes discussed above. If the UE has found a cell, method 300 moves to 308, where the UE can regain its connection to a cell (e.g., base station 101 of FIG. 1) and the UE can regain its full service.

However, if the UE does not find a cell or finds a cell with limited service, method 300 moves to 310. At 310, the UE is in a no-service mode or is in a limited-service mode after the cell search. According to some aspects, the no-service mode can include a mode where the UE is not connected to any cell. Additionally, or alternatively, the no-service mode can include a mode where the UE is connected to a cell but the UE does not have any service from the cell. The no-service mode can include other examples. According to some aspects, the limited-service mode can include a mode where the UE is connected to a cell but the UE has a limited service from the cell. The limited-service mode can include other examples.

In response to the determination that the UE is in a no-service mode or in a limited-service mode after the cell search (e.g., after the cell search cycle), the UE (by itself and/or using the network) can configure (e.g., adjust) a value of the cell search sleep timer (e.g., cell search sleep timer 256 of FIG. 2) based on the aspects of this disclosure. According to some aspects, in response to the determination that the UE is in the no-service mode or in the limited-service mode, the UE can adjust the value of the cell search sleep timer based at least on a charge level of the battery of the UE as discussed above and further discussed with respect to FIGS. 4A and 4B. Additionally, or alternatively, in response to the determination that the UE is in the no-service mode or in the limited-service mode, the UE can adjust the value of the cell search sleep timer based at least on a capacity level of the battery of the UE as discussed above and further discussed with respect to FIGS. 5A and 5B. Additionally, or alternatively, in response to the determination that the UE is in the no-service mode or in the limited-service mode, the UE can adjust the value of the cell search sleep timer based at least on a determination that the UE is in the Low Power Mode, as discussed above. After configuring (e.g., adjusting) the value of the cell search sleep timer, the UE can perform a second cell search after the configured (adjusted) value of the cell search sleep timer. In other words (an as discussed with respect to FIGS. 4A, 4B, 5A, and 5B—e.g., steps 434 and 534 discussed below), the UE can perform the second cell search after the configured (adjusted) value of the cell search sleep timer has expired.

Figure 4A:
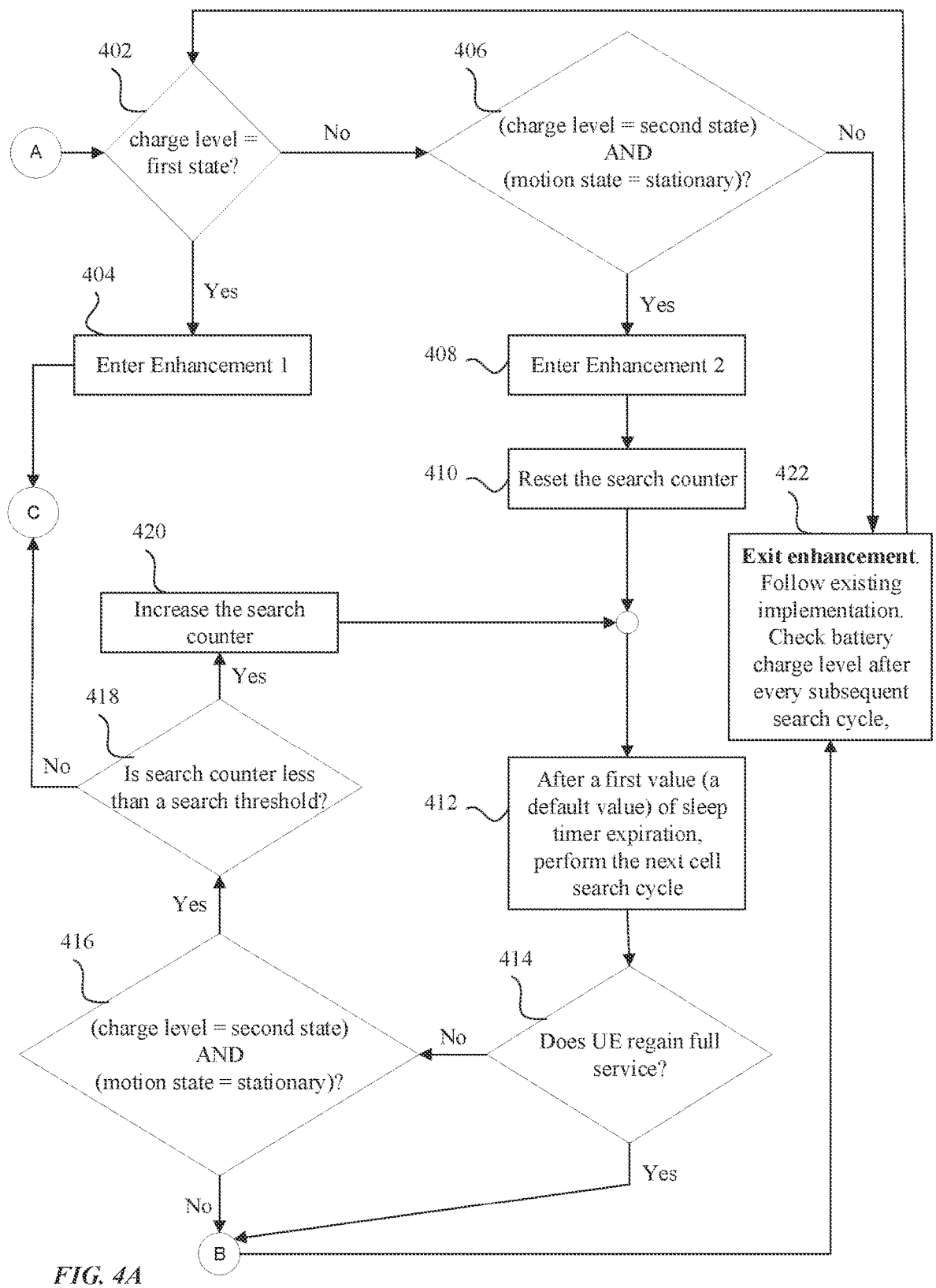
FIGS. 4A-4B illustrate an example method for a system (for example, a UE) performing cell search based on UE's battery charge level, according to some aspects of the disclosure.
Figure 4B:
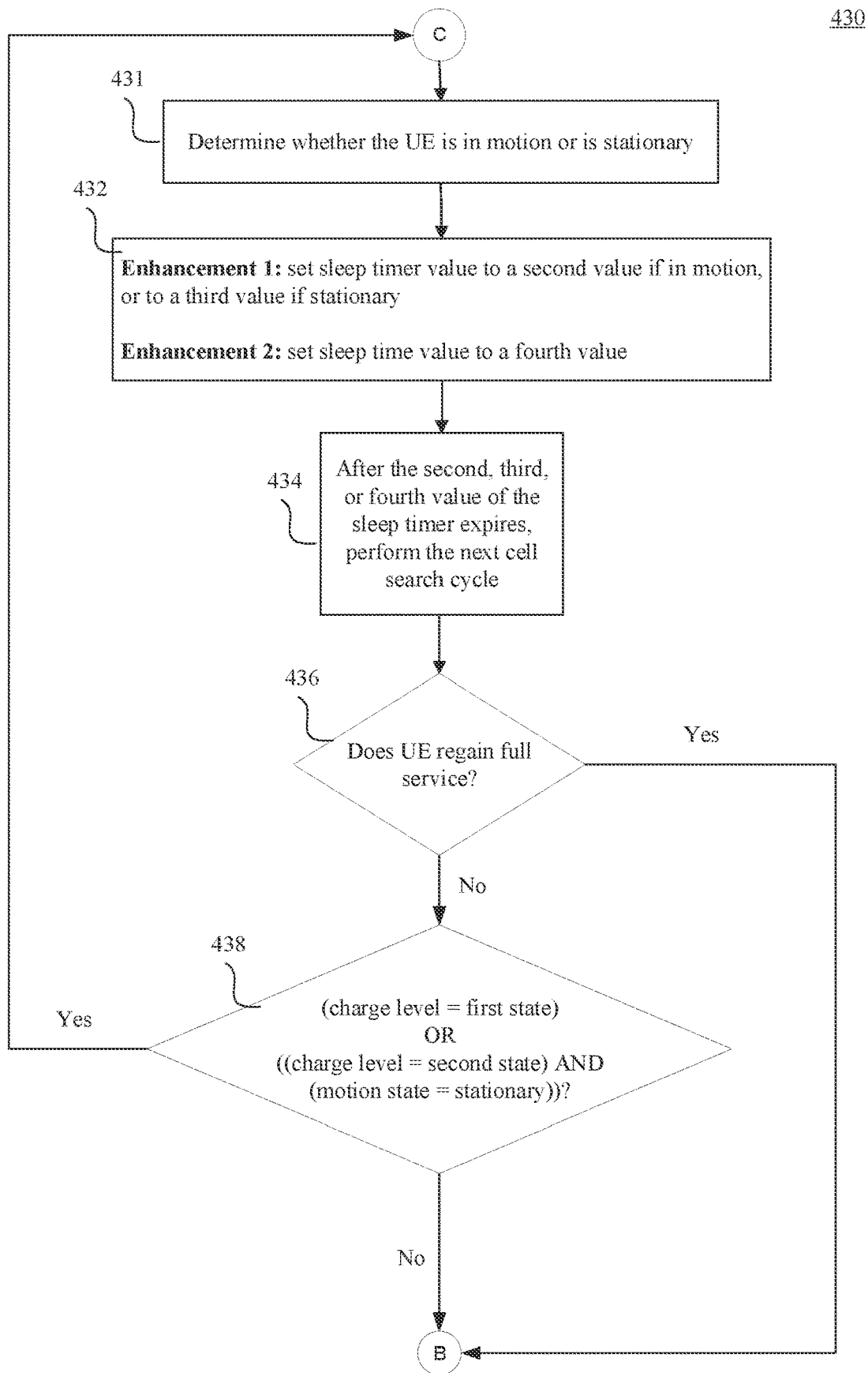

FIGS. 4A-4B illustrate an example method for a system (for example, a UE) performing cell search based on UE's battery charge level, according to some aspects of the disclosure. As a convenience and not a limitation, FIGS. 4A-4B may be described with regard to elements of FIGS. 1-3. Methods 400 and 430 may represent the operation of an electronic device (for example, UE 103 of FIG. 1) implementing cell search based on UE's battery charge level. Methods 400 and 430 may also be performed by system 200 of FIG. 2 and/or computer system 600 of FIG. 6. But methods 400 and 430 are not limited to the specific aspects depicted in those figures and other systems may be used to perform the method as will be understood by those skilled in the art. It is to be appreciated that not all operations may be needed, and the operations may not be performed in the same order as shown in FIGS. 4A-4B.

As discussed above with respect to step 310 of FIG. 3, in response to the determination that the UE is in the no-service mode or in the limited-service mode, the UE can adjust the cell search sleep timer based at least on a charge level of a battery of the UE as discussed above and further with discussed respect to FIGS. 4A and 4B.

At 402, a charge level of the battery of the UE is compared to a first state. For example, the UE can use one or more sensors (e.g., sensor(s) 280 of FIG. 2) to measure the charge level of the UE's battery (e.g., battery 270 of FIG. 2). The UE can then compare the charge level of the battery with a first condition. According to some aspects, the first condition can include a first charge level threshold. In other words, the first state can include charge levels below the first charge level threshold. In a non-limiting example, the first charge level threshold can include 20% of a full charge level. However, the aspects of this disclosure are not limited to this example and the first condition can include other examples and the first charge level threshold can include other values.

If the charge level of the battery of the UE satisfies the first condition, then method 400 can move to 404. For example, if the charge level of the battery of the UE is less than the first charge level threshold, method 400 can move to 404.

At 404, the UE can enter a first enhancement mode. In the first enhancement mode of 404, it can be determined whether the UE is in motion or is stationary. For example, at 431 of method 430 of FIG. 4B, it is determined whether the UE is in motion or is stationary. In one example, the UE can use one or more sensors (e.g., sensor(s) 280 of FIG. 2) to determine whether the UE is in motion or is stationary.

According to some aspects, at 432 of method 430 of FIG. 4B, in response to determining that the charge level of the battery satisfies the first condition and the UE is in motion, the UE can increase the sleep timer value from a first value (e.g., a default value) to a second value that is greater than the first value. An increase in the sleep timer value from the first value increases the time between cell searches.

According to some aspects, at 432 of method 430 of FIG. 4B, in response to determining that the charge level of the battery satisfies the first condition and the UE is stationary, the UE can increase the sleep timer value from the first value (e.g., the default value) to a third value, which is greater than the first value. In some examples, the second and third values can be the same. In some examples, the second and third values can be different values. For example, the third value (the sleep timer value for the stationary UE) can be greater than the second value (the sleep timer value for the moving UE).

After adjusting the sleep timer value based on the charge level at 432, method 430 can move to method 434. At 434, after the expiration of the second value or the third value of the cell search sleep timer, the UE can perform the next cell search. At 436, the UE determines whether it has gained full service. If the UE determines that it has gained full service, method 430 moves to 422 of method 400, which is discussed in more detail below.

If the UE determines that it has not gained full service (e.g., in no-service mode or in limited-service mode), method 430 moves to 438. At 438, the UE determines whether its battery charge level satisfies the first state (discussed above) or a second state (which is discussed in detail below with respect to step 406). If the charge level satisfies the first state, or the charge level satisfies the second state and the UE is stationary, method 430 moves back to 432 to repeat the first enhancement mode or a second enhancement mode discussed herein. Otherwise, method 430 moves to 422 of method 400, which is discussed in more detail below.

Moving back to 402, if the charge level of the battery of the UE does not satisfy the first condition, then method 400 can move to 406. For example, if the charge level of the battery of the UE is greater than or equal to the first charge level threshold, method 400 can move to 406.

At 406, the charge level of the battery of the UE is compared to a second state and it is determined whether the UE is stationary or in motion. For example, the UE can compare the charge level of the battery with a second condition. According to some aspects, the second condition can include a second charge level threshold and a third charge level threshold. In other words, the second state can include charge levels between the second charge level threshold and the third charge level threshold. In a non-limiting example, the second charge level threshold can include 20% of a full charge level and the third charge level threshold can include 50% of the full charge level. However, the aspects of this disclosure are not limited to this example and the second condition can include other examples and the second and third charge level thresholds can include other values.

According to some aspects, in response to determining that the charge level of the battery satisfies the second condition and the UE is stationary, method 400 can move to 408. At 408, the UE can enter the second enhancement mode. As discussed in more detail below, during the second enhancement mode, the UE uses a search counter (e.g., search counter 258 of FIG. 2) to count the number of times that the UE uses the first value (e.g., the default value) of the sleep timer value for the UE's cell search cycles. If the value of the search counter satisfies a condition, then the UE can adjust the sleep timer value.

After entering the second enhancement mode, method 400 moves to 410. At 410, the value of the search counter is reset. The search counter indicates a number of cell search cycles performed using the first value (e.g., the default value) of the sleep timer.

At 412, the UE uses the first value (e.g., the default value) of the sleep timer for the UE's cell search cycles. After the expiration of the sleep timer (which has the first value), the UE performs a cell search at 412.

At 414, it is determined whether the UE has gained full service with a cell. If the UE has gained the full service, method 400 moves to 422. At 422, the UE exits the enhancement mode and can follow existing implementations (e.g., using the first value for sleep timer). During 422, the UE can monitor its battery charge, battery capacity, and/or Low Power Mode. Depending on the results of the monitoring, the UE can move to methods of FIGS. 4A-4B, methods of FIGS. 5A-5B, the Low Power Mode discussed above, and/or keep monitoring its battery.

At 414, if the UE determines that it has not gained full service (e.g., in no-service mode or in limited-service mode), method 400 moves to 416. At 416 (similar to 406), the charge level of the battery of the UE is compared to the second state and it is determined whether the UE is stationary or in motion. For example, the UE can compare the charge level of the battery with a second condition. According to some aspects, the second condition can include the second charge level threshold and the third charge level threshold discussed above.

According to some aspects, in response to determining that the charge level of the battery does not satisfy the second condition or the UE is in motion, method 400 can move to 422.

However, in response to determining that the charge level of the battery satisfies the second condition and the UE is stationary, method 400 can move to 418.

At 418, the value of the search counter is compared to a search counter threshold. If the value of the search counter is less than the search counter threshold, the value of the search counter in increased (e.g., by 1) at 420. Then, method 400 moves to 412.

However, if the value of the search counter is greater than or equal to the search counter threshold, method 400 moves to 431 of method 430 of FIG. 4B. At 431, it can be determined whether the UE is in motion or is stationary. In some aspects, step 431 is an optional step before step 432 and if the value of the search counter is greater than or equal to the search counter threshold, method 400 can directly move to 432. At 432, in response to the search counter being greater than or equal to the search counter threshold, the UE can increase the sleep timer value from the first value (e.g., the default value) to a fourth value, which is greater than the first value. In some examples, the second, third, and fourth values of the sleep timer can be the same. In some examples, the second, third, and fourth values of the sleep timer can be different values. In some examples, the third value and the fourth values of the sleep timer can be the same. For example, the fourth value (the sleep timer value for the stationary UE) can be greater than the second value (the sleep timer value for the moving UE).

After 432, method 430 can move to 434, 436, 438, and/or 422, as discussed above.

Figure 5A:
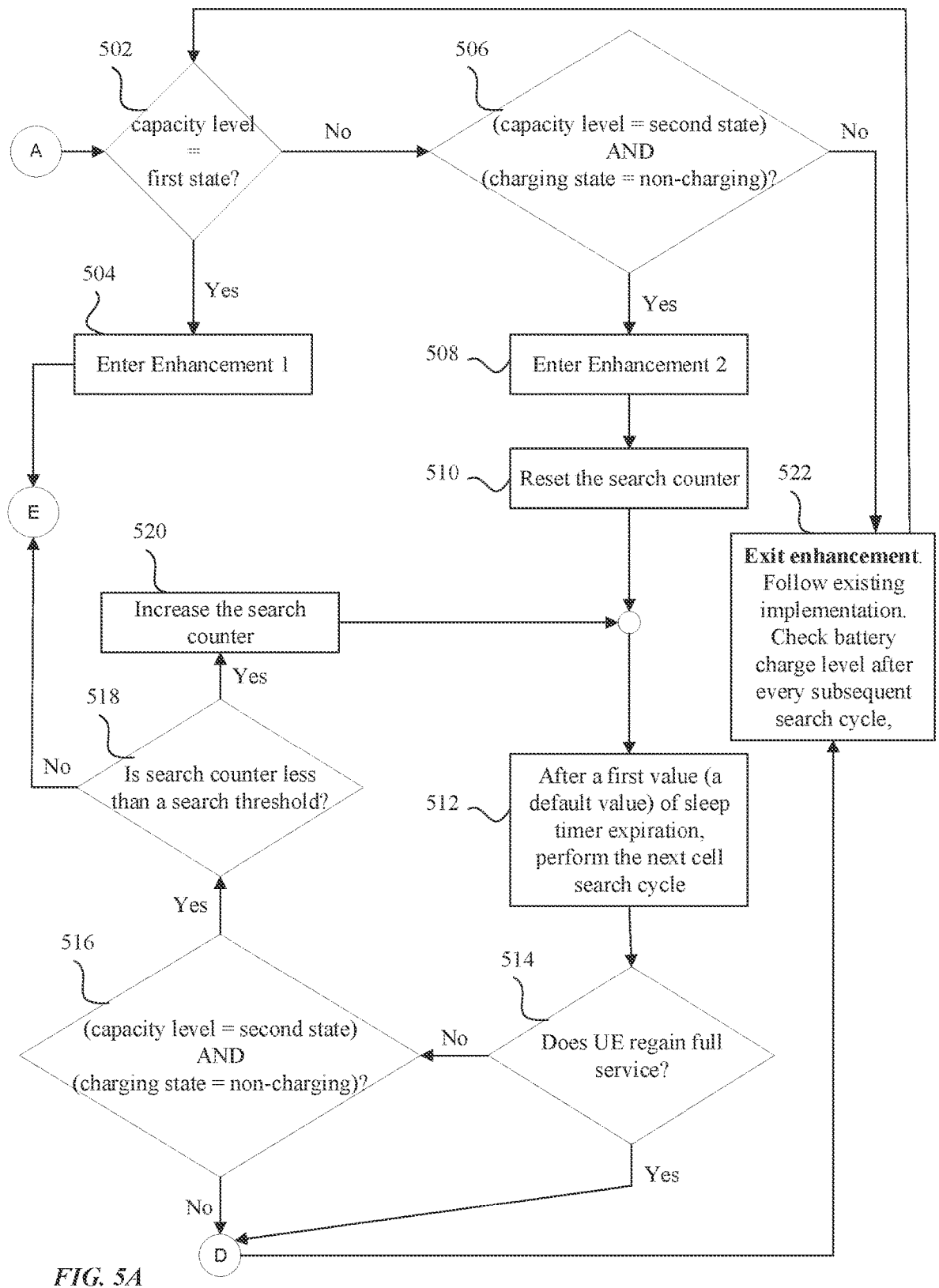
FIGS. 5A-5B illustrate an example method for a system (for example, a UE) performing cell search based on UE's battery capacity level, according to some aspects of the disclosure.
Figure 5B:
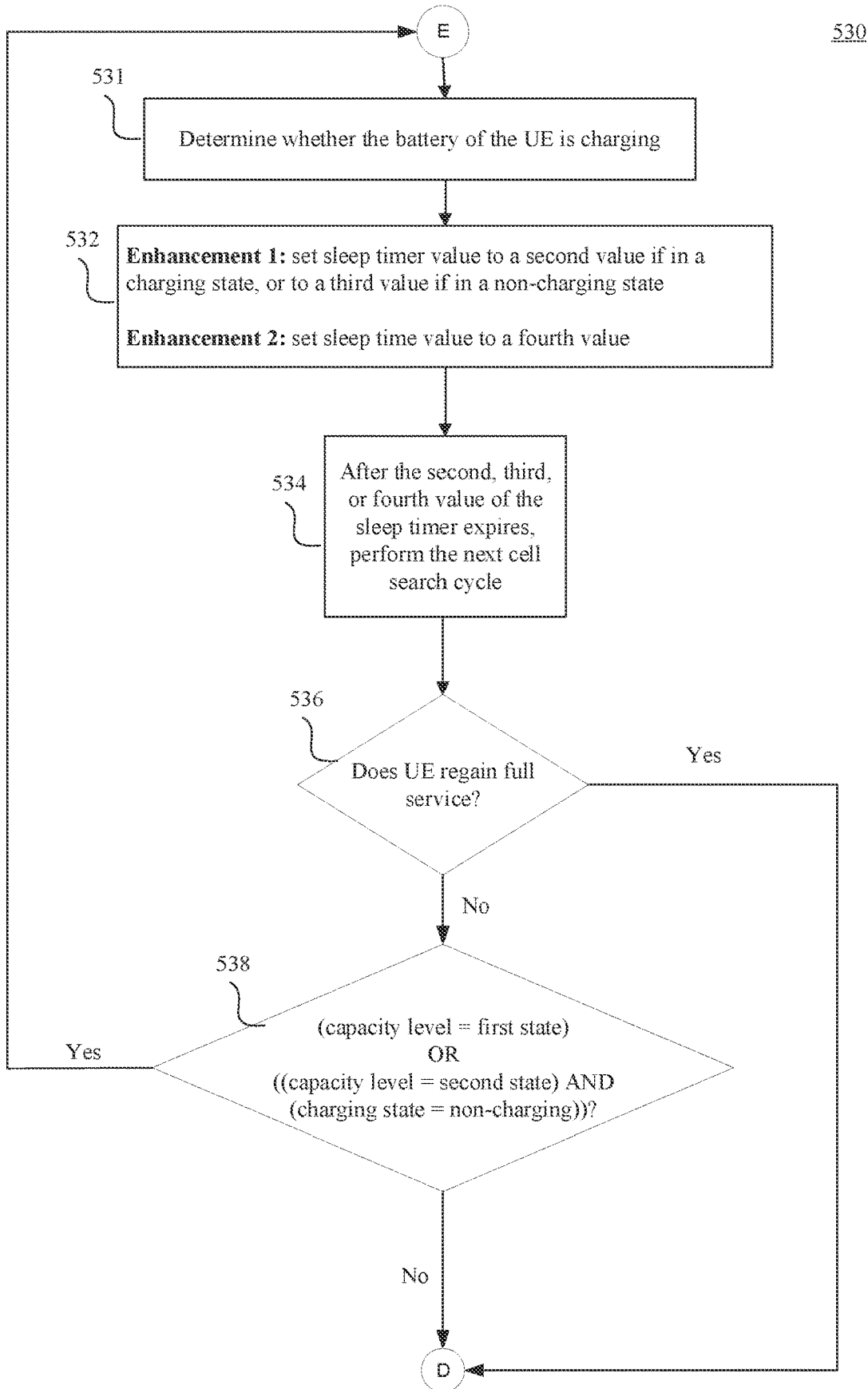

FIGS. 5A-5B illustrate an example method for a system (for example, a UE) performing cell search based on UE's battery capacity level, according to some aspects of the disclosure. As a convenience and not a limitation, FIGS. 5A-5B may be described with regard to elements of FIGS. 1-4. Methods 500 and 530 may represent the operation of an electronic device (for example, UE 103 of FIG. 1) implementing cell search based on UE's battery capacity level. Methods 500 and 530 may also be performed by system 200 of FIG. 2 and/or computer system 600 of FIG. 6. But methods 500 and 530 are not limited to the specific aspects depicted in those figures and other systems may be used to perform the method as will be understood by those skilled in the art. It is to be appreciated that not all operations may be needed, and the operations may not be performed in the same order as shown in FIGS. 5A-5B.

As discussed above with respect to step 310 of FIG. 3, in response to the determination that the UE is in the no-service mode or in the limited-service mode, the UE can adjust the cell search sleep timer based at least on a capacity level of a battery of the UE as discussed above and further with discussed respect to FIGS. 5A and 5B.

At 502, a capacity level of the battery of the UE is compared to a first state. For example, the UE can use one or more sensors (e.g., sensor(s) 280 of FIG. 2) to measure the capacity level of the UE's battery (e.g., battery 270 of FIG. 2). The UE can then compare the capacity level of the battery with a first condition. According to some aspects, the first condition can include a first capacity level threshold. In other words, the first state can include capacity levels below the first capacity level threshold. In a non-limiting example, the first capacity level threshold can include 50% of a full capacity level. However, the aspects of this disclosure are not limited to this example and the first condition can include other examples and the first capacity level threshold can include other values.

If the capacity level of the battery of the UE satisfies the first condition, then method 500 can move to 504. For example, if the capacity level of the battery of the UE is less than the first capacity level threshold, method 500 can move to 504.

At 504, the UE can enter a first enhancement mode. In the first enhancement mode of 504, it can be determined whether the battery of the UE is charging or not. For example, at 531 of method 530 of FIG. 5B, it is determined whether the battery of the UE is charging or not. In one example, the UE can use one or more sensors (e.g., sensor(s) 280 of FIG. 2) to determine whether the battery of the UE is charging or not.

According to some aspects, at 532 of method 530 of FIG. 5B, in response to determining that the capacity level of the battery satisfies the first condition and the UE is in a charging state (e.g., the battery of the UE is charging—the UE is connected to a charger), the UE can increase the sleep timer value from a first value (e.g., a default value) to a second value that is greater than the first value. An increase in the sleep timer value from the first value increases the time between cell searches.

According to some aspects, at 532 of method 530 of FIG. 5B, in response to determining that the capacity level of the battery satisfies the first condition and the UE is in a non-charging state (e.g., the battery of the UE is not charging—the UE is not connected to a charger), the UE can increase the sleep timer value from the first value (e.g., the default value) to a third value, which is greater than the first value. In some examples, the second and third values can be the same. In some examples, the second and third values can be different values. For example, the third value (the sleep timer value for the non-charging UE) can be greater than the second value (the sleep timer value for the charging UE).

After adjusting the sleep timer value based on the capacity level at 532, method 530 can move to 534. At 534, after the expiration of the second value or the third value of the cell search sleep timer, the UE can perform the next cell search. At 536, the UE determines whether it has gained full service. If the UE determines that it has gained full service, method 530 moves to 522 of method 500, which is discussed in more detail below.

If the UE determines that it has not gained full service (e.g., in no-service mode or in limited-service mode), method 530 moves to 538. At 538, the UE determines whether its battery capacity level satisfies the first state (discussed above) or a second state (which is discussed in detail below with respect to step 506). If the capacity level satisfies the first state, or the capacity level satisfies the second state and the battery of the UE is not charging, method 530 moves back to 532 to repeat the first enhancement mode or a second enhancement mode discussed herein. Otherwise, method 530 moves to 522 of method 500, which is discussed in more detail below.

Moving back to 502, if the capacity level of the battery of the UE does not satisfy the first condition, then method 500 can move to 506. For example, if the capacity level of the battery of the UE is greater than or equal to the first capacity level threshold, method 500 can move to 506.

At 506, the capacity level of the battery of the UE is compared to a second state and it is determined whether the battery of the UE is charging or not. For example, the UE can compare the capacity level of the battery with a second condition. According to some aspects, the second condition can include a second capacity level threshold and a third capacity level threshold. In other words, the second state can include capacity levels between the second capacity level threshold and the third capacity level threshold. In a non-limiting example, the second capacity level threshold can include 50% of a full capacity level and the third capacity level threshold can include 80% of the full capacity level. However, the aspects of this disclosure are not limited to this example and the second condition can include other examples and the second and third capacity level thresholds can include other values.

According to some aspects, in response to determining that the capacity level of the battery satisfies the second condition and the UE is in a non-charging state (e.g., the battery of the UE is not charging—the UE is not connected to a charger), method 500 can move to 508. At 508, the UE can enter the second enhancement mode. As discussed in more detail below, during the second enhancement mode, the UE uses a search counter (e.g., a capacity search counter such as search counter 258 of FIG. 2) to count the number of times that the UE uses the first value (e.g., the default value) of the sleep timer value for the UE's cell search cycles. If the value of the search counter satisfies a condition, then the UE can adjust the sleep timer value.

After entering the second enhancement mode, method 500 moves to 510. At 510, the value of the search counter is reset. The search counter indicates a number of cell search cycles performed using the first value (e.g., the default value) of the sleep timer.

At 512, the UE uses the first value (e.g., the default value) of the sleep timer for the UE's cell search cycles. After the expiration of the sleep timer (which has the first value), the UE performs a cell search at 512.

At 514, it is determined whether the UE has gained full service with a cell. If the UE has gained the full service, method 500 moves to 522. At 522, the UE exits the enhancement mode and can follow existing implementations (e.g., using the first value for sleep timer). During 522, the UE can monitor its battery charge, battery capacity, and/or Low Power Mode. Depending on the results of the monitoring, the UE can move to methods of FIGS. 4A-4B, methods of FIGS. 5A-5B, the Low Power Mode discussed above, and/or keep monitoring its battery.

At 514, if the UE determines that it has not gained full service (e.g., in no-service mode or in limited-service mode), method 500 moves to 516. At 516 (similar to 506), the capacity level of the battery of the UE is compared to the second state and it is determined whether the battery of the UE is charging or not. For example, the UE can compare the capacity level of the battery with a second condition. According to some aspects, the second condition can include the second capacity level threshold and the third capacity level threshold discussed above.

According to some aspects, in response to determining that the capacity level of the battery does not satisfy the second condition or the UE is in charging state (e.g., the battery of the UE is charging—the UE is connected to a charger), method 500 can move to 522.

However, in response to determining that the capacity level of the battery satisfies the second condition and the UE is in non-charging state (e.g., the battery of the UE is not charging—the UE is not connected to a charger), method 500 can move to 518.

At 518, the value of the search counter is compared to a search counter threshold. If the value of the search counter is less than the search counter threshold, the value of the search counter in increased (e.g., by 1) at 520. Then, method 500 moves to 512.

However, if the value of the search counter is greater than or equal to the search counter threshold, method 500 moves to 531 of method 530 of FIG. 5B. At 531, it can be determined whether the battery of the UE is charging or not. In some aspects, step 531 is an optional step before step 532 and if the value of the search counter is greater than or equal to the search counter threshold, method 500 can directly move to 532. At 532, in response to the search counter being greater than or equal to the search counter threshold, the UE can increase the sleep timer value from the first value (e.g., the default value) to a fourth value, which is greater than the first value. In some examples, the second, third, and fourth values of the sleep timer can be the same. In some examples, the second, third, and fourth values of the sleep timer can be different values. In some examples, the third value and the fourth values of the sleep timer can be the same. For example, the fourth value (the sleep timer value for the non-charging UE) can be greater than the second value (the sleep timer value for the charging UE).

After 532, method 530 can move to 534, 536, 538, and/or 522, as discussed above.

Figure 6:
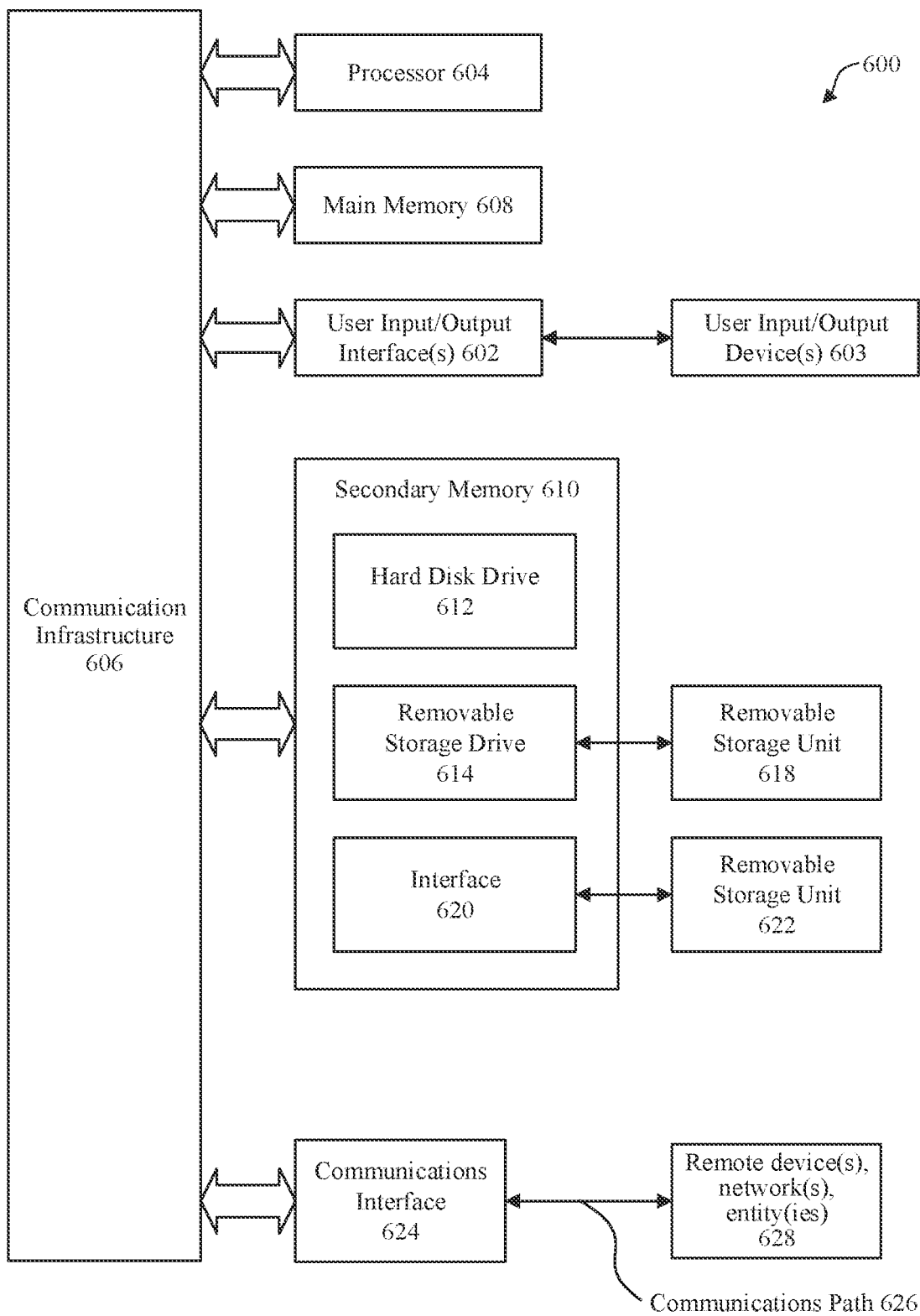
FIG. 6 is an example computer system for implementing some aspects or portion(s) thereof. The present disclosure is described with reference to the accompanying drawings.

Various aspects can be implemented, for example, using one or more computer systems, such as computer system 600 shown in FIG. 6. Computer system 600 can be any well-known computer capable of performing the functions described herein such as devices 101, 103 of FIG. 1, and/or 200 of FIG. 2. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
a transceiver configured to wirelessly communicate with a base station; and
a processor communicatively coupled to the transceiver and configured to:
in response to a determination that a connection with the base station has been lost, perform a cell search cycle;
in response to a determination that the UE is in a no-service mode or in a limited-service mode after the cell search cycle, configure a sleep timer value based at least on a charge level of a battery of the UE, wherein configuring the sleep timer value comprises:
determining whether the charge level of the battery satisfies a first condition;
in response to determining that the charge level of the battery satisfies the first condition and the UE is in motion, increasing the sleep timer value from a first value to a second value greater than the first value;
in response to determining that the charge level of the battery satisfies the first condition and the UE is stationary, increasing the sleep timer value from the first value to a third value greater than the first value;
in response to determining that the charge level of the battery does not satisfy the first condition, determining whether the charge level of the battery satisfies a second condition;
in response to determining that the charge level of the battery satisfies the second condition and the UE is stationary:
comparing a search counter value indicating a number of cell search cycles with a search counter threshold; and
in response to the search counter value being greater than the search counter threshold, increasing the sleep timer value from the first value to a fourth value greater than the first value; and
perform a second cell search cycle after the configured sleep timer value.

2. The UE of claim 1, wherein:
the first condition comprises the charge level of the battery being less than a first charge level threshold, and
the second condition comprises the charge level of the battery being more than a second charge level threshold and less than a third charge level threshold.

3. The UE of claim 2, wherein at least one of the first charge level threshold, the second charge level threshold, and the third charge level threshold is determined based at least on a capacity level of the battery.

4. The UE of claim 1, wherein to configure the sleep timer value, the processor is further configured to:
determine whether a capacity level of the battery satisfies a first capacity condition;
in response to determining that the capacity level of the battery satisfies the first capacity condition and the battery of the UE is in a charging state, increase the sleep timer value from a fifth value to a sixth value greater than the fifth value; and
in response to determining that the capacity level of the battery satisfies the first capacity condition and the battery of the UE is in a non-charging state, increase the sleep timer value from the fifth value to a seventh value greater than the fifth value.

5. The UE of claim 4, wherein in response to determining that the capacity level of the battery does not satisfy the first capacity condition, the processor is configured to:
determine whether the capacity level of the battery satisfies a second capacity condition; and
in response to determining that the capacity level of the battery satisfies the second capacity condition and the battery of the UE is in the non-charging state:
compare the search counter value indicating the number of cell search cycles with the search counter threshold; and
in response to the search counter value being greater than the search counter threshold, increase the sleep timer value from the fifth value to an eighth value greater than the fifth value.

6. The UE of claim 5, wherein:
the first capacity condition comprises the capacity level of the battery being less than a first capacity level threshold; and
the second capacity condition comprises the capacity level of the battery being more than a second capacity level threshold and less than a third capacity level threshold, and the battery of the UE is in the non-charging state.

7. The UE of claim 1, wherein the processor is further configured to:
determine whether the UE is in a Low Power Mode (LPM);
in response to determining that the UE is in the LPM and the UE is in motion, increase the sleep timer value from a fifth value to a sixth value greater than the fifth value; and
in response to determining that the UE is in the LPM and the UE is stationary, increase the sleep timer value from the fifth value to a seventh value greater than the fifth value.

8. A method comprising:
in response to a determination that a connection of a user equipment (UE) with a base station has been lost, performing a cell search cycle;
in response to a determination that the UE is in a no-service mode or in a limited-service mode after the cell search cycle, configuring a sleep timer value based at least on a charge level of a battery of the UE, wherein configuring the sleep timer value comprises:
determining whether the charge level of the battery satisfies a first condition;
in response to determining that the charge level of the battery satisfies the first condition and the UE is in motion, increasing the sleep timer value from a first value to a second value greater than the first value;
in response to determining that the charge level of the battery satisfies the first condition and the UE is stationary, increasing the sleep timer value from the first value to a third value greater than the first value;
in response to determining that the charge level of the battery does not satisfy the first condition, determining whether the charge level of the battery satisfies a second condition;
in response to determining that the charge level of the battery satisfies the second condition and the UE is stationary:
comparing a search counter value indicating a number of cell search cycles with a search counter threshold; and
in response to the search counter value being greater than the search counter threshold, increasing the sleep timer value from the first value to a fourth value greater than the first value; and
performing a second cell search cycle after the configured sleep timer value.

9. The method of claim 8, wherein:
the first condition comprises the charge level of the battery being less than a first charge level threshold, and
the second condition comprises the charge level of the battery being more than a second charge level threshold and less than a third charge level threshold.

10. The method of claim 9, wherein at least one of the first charge level threshold, the second charge level threshold, and the third charge level threshold is determined based at least on a capacity level of the battery.

11. The method of claim 8, wherein the configuring the sleep timer value further comprises:
determining whether a capacity level of the battery satisfies a first capacity condition;
in response to determining that the capacity level of the battery satisfies the first capacity condition and the battery of the UE is in a charging state, increasing the sleep timer value from a fifth value to a sixth value greater than the fifth value; and
in response to determining that the capacity level of the battery satisfies the first capacity condition and the battery of the UE is in a non-charging state, increasing the sleep timer value from the fifth value to a seventh value greater than the fifth value.

12. The method of claim 11, wherein in response to determining that the capacity level of the battery does not satisfy the first capacity condition, the method further comprises:
determining whether the capacity level of the battery satisfies a second capacity condition; and
in response to determining that the capacity level of the battery satisfies the second capacity condition and the battery of the UE is in the non-charging state:
comparing the search counter value indicating the number of cell search cycles with the search counter threshold; and in response to the search counter value being greater than the search counter threshold, increasing the sleep timer value from the fifth value to an eighth value greater than the fifth value.

13. The method of claim 12, wherein:
the first capacity condition comprises the capacity level of the battery being less than a first charge level threshold, and
the second capacity condition comprises the capacity level of the battery being more than a second capacity level threshold and less than a third capacity level threshold, and the battery of the UE is in the non-charging state.

14. The method of claim 8, further comprising:
determining whether the UE is in a Low Power Mode (LPM);
in response to determining that the UE is in the LPM and the UE is in motion, increasing the sleep timer value from a fifth value to a sixth value greater than the fifth value; and
in response to determining that the UE is in the LPM and the UE is stationary, increasing the sleep timer value from the fifth value to a seventh value greater than the fifth value.

15. A non-transitory computer-readable medium storing instructions that when executed by a processor of a user equipment (UE) cause the UE to perform operations comprising:
in response to a determination that a connection of the UE with a base station has been lost, performing a cell search cycle;
in response to a determination that the UE is in a no-service mode or in a limited-service mode after the cell search cycle, configuring a sleep timer value based at least on a charge level of a battery of the UE, wherein configuring the sleep timer value comprises:
determining whether the charge level of the battery satisfies a first condition;
in response to determining that the charge level of the battery satisfies the first condition and the UE is in motion, increasing the sleep timer value from a first value to a second value greater than the first value;
in response to determining that the charge level of the battery satisfies the first condition and the UE is stationary, increasing the sleep timer value from the first value to a third value greater than the first value;
in response to determining that the charge level of the battery does not satisfy the first condition, determining whether the charge level of the battery satisfies a second condition;
in response to determining that the charge level of the battery satisfies the second condition and the UE is stationary:
comparing a search counter value indicating a number of cell search cycles with a search counter threshold; and
in response to the search counter value being greater than the search counter threshold, increasing the sleep timer value from the first value to a fourth value greater than the first value; and
performing a second cell search cycle after the configured sleep timer value.

* * * * *